United States Patent
Ihde et al.

(10) Patent No.: US 6,665,784 B2
(45) Date of Patent: *Dec. 16, 2003

(54) METHOD FOR WRITING AND READING DATA TO AND FROM A COMPACT DISC MEDIA

(75) Inventors: Wayne William Ihde, Boulder, CO (US); Robert Scott Tracy, Golden, CO (US); Michael Scott McMurdie, Pleasanton, CA (US)

(73) Assignee: Roxio, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/389,829

(22) Filed: Sep. 3, 1999

(65) Prior Publication Data

US 2003/0101315 A1 May 29, 2003

(51) Int. Cl.$^7$ .............................. G06F 12/00; G06F 13/00
(52) U.S. Cl. ........................ 711/170; 711/4; 711/154; 369/124.06; 369/124.08
(58) Field of Search ................................ 711/154, 170, 711/172, 4, 112; 707/101, 205; 369/53.44, 53.24, 124.06, 124.08

(56) References Cited

U.S. PATENT DOCUMENTS

| | | | | |
|---|---|---|---|---|
| 5,734,892 A | * | 3/1998 | Chu | 707/101 |
| 6,009,502 A | * | 12/1999 | Boeuf | 707/205 |
| 6,091,686 A | * | 7/2000 | Caffarelli et al. | 369/53.24 |
| 6,226,241 B1 | * | 5/2001 | D'Amato et al. | 369/124.08 |
| 6,308,177 B1 | * | 10/2001 | Israni et al. | 707/100 |

FOREIGN PATENT DOCUMENTS

| | | | | |
|---|---|---|---|---|
| EP | 08087432 | | 4/1996 | G06F/12/00 |
| EP | 0 730 274 A2 | | 9/1996 | G11B/27/034 |
| EP | 10143404 | | 5/1998 | G06F/12/00 |

OTHER PUBLICATIONS

Unknown, "*OSTA Universal Disk Format Specification*", Rev. 2.00, Apr. 3, 1998, Optical Storage Tech. Assoc., Santa Barbara, CA www.osta.org.

(List continued on next page.)

*Primary Examiner*—Kevin L. Ellis
*Assistant Examiner*—Pierre M. Vital
(74) *Attorney, Agent, or Firm*—Martine & Penilla, LLP

(57) ABSTRACT

A method for writing a file of data to a compact disc media is provided. The method begins by receiving a first portion of the file for writing to the compact disc media. The first portion can be any portion of the file. Once received, the first portion is divided into a plurality of chunks. A map data sector is then generated for a set of the plurality of chunks, and the map data sector includes information for interrelating the file data and the plurality of chunks to be written to the compact disc media. The map data sector is then written to the compact disc media followed by the plurality of chunks of the first portion of the file. If possible, the plurality of chunks are first compressed before writing to the compact disc media. If the first portion is long enough to fill multiple sets of chunks, associated map data sectors will be generated for those additional sets of chunks. Reading of a file written to the compact disc media will include reading the map data for the file, decompressing the file if needed and then arranging the chunks of data in accordance with information provided by the map data. The file is then transferred to the requesting application in the arranged file order.

25 Claims, 8 Drawing Sheets

OTHER PUBLICATIONS

Unknown, *"Packet Writing & UDF CD Recording's Logical Next Step"*, XP–000972775. http://www.onlineinc.com/emedia.

Unknown, *"Volume and File Structure of Read–Only and Write–Once Compact Disk Media for Information Interchange"*, Standard ECMA XP–002155923, 2$^{nd}$ Ed., Dec. 1994. http://www.ecma.ch.

K. Osborn, *"Block, Append: Packet Writing and New File System Formats"*, XP–000972772, CD ROM Professional, pp. 97–102, 104–106, Feb. 1996.

Unknown, *"Universal Disk Format™ Speecification"*, Rev. 1.50, XP–002155924, Feb. 4, 1997, Optical Storage Technology Assoc. (OSTA).

* cited by examiner

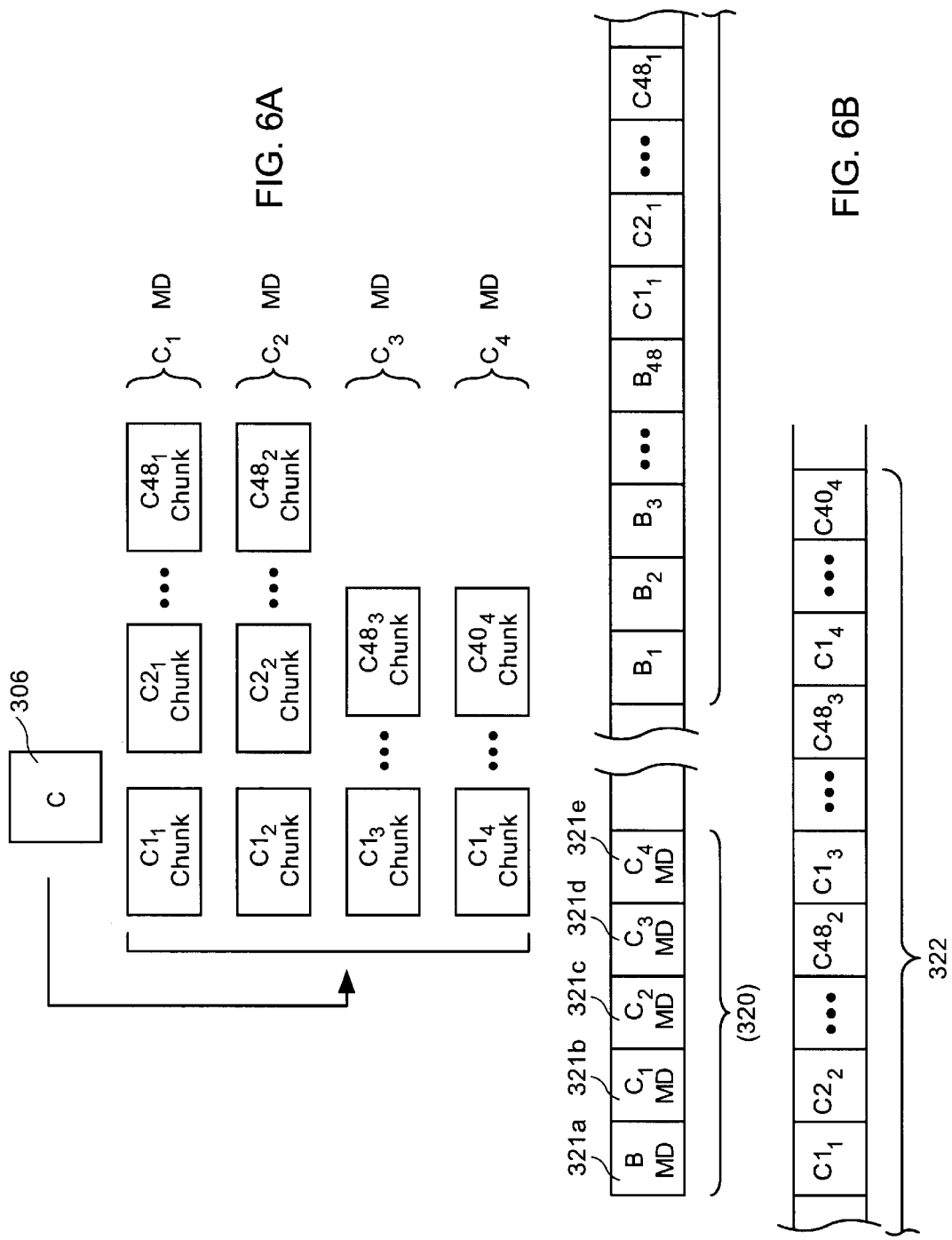

METHOD FOR WRITING AND READING DATA TO AND FROM A COMPACT DISC MEDIA

BACKGROUND OF THE INVENTION

1. Field of the Invention

This invention relates generally to computer systems, and more particularly to methods and computer readable media for writing and reading to and from a compact disc (CD) media.

2. Description of the Related Art

In recent years, compact disc (CD) recording technology has made substantial advancements that have enabled casual computer users to digitally record digitally all types of data to the CD media. As is well known, there are several types of CD media recording standards and associated media. Two commonly used CD media recording standards include a compact disc recordable (CD-R) standard and a compact disc rewritable (CD-RW) standard. Using the CD-R standard, users are able to record data onto a CD-R disc only one time. This is because the data that is digitally written to the CD-R causes a permanent change in the properties of the CD-R. This change in property is often referred to as the "burning" of data onto the CD.

On the other hand, CD-RW technology allows rewriting of data previously stored onto the CD media. CD-RW, unlike CD-R, performs recording by making use of phase change materials in its recording layer. When that phase change material is irradiated by a laser beam, the data can be erased (crystal phase) and recorded (amorphous phase). Then, by way of differences in the reflectivity of either the crystal phase or amorphous phase, the data stored on the media can be read. This therefore enables repeated erasing and recording of data to the same CD media. CD media recorded using the CD-RW technology is typically not readable by standard CD-ROM drives. To do this, a program called MultiRead is required to be installed on the computer. This is different that CD media recorded using CD-R technology, which is readable by standard CD-ROM drives.

As is well known to those skilled in the art, data written using CD-RW and CD-R technology uses a standard called Universal Disk Format (UDF) to accomplish the writing. Writing data in accordance with the UDF standard provides great flexibility in terms of transferring data between a CD media and other storage devices, such as hard disks and floppy disks. Unfortunately, when a file is to be written, the file system will often times not provide the entire file in sequential order or at the same time. For instance, the first part of the file to be written can, in many cases be data associated with the middle or end of a file.

In order to facilitate reading of files from the CD media, software algorithms are commonly used to arrange the data being received from the file system in a correct order before writing to the CD media is commenced. A problem with this arranging technique is that the software algorithms can become quite complex. In addition to complexity, the CPU is also called upon to perform additional processing, which has the down side of slowing down writing operations to CD media.

In view of the foregoing, there is a need for computer implemented methods to enable writing of files to a CD media in the order the file data is received from the file system. This can significantly reduce writing complexity and pre-writing processing.

SUMMARY OF THE INVENTION

Broadly speaking, the present invention fills these needs by providing methods and computer readable media for writing file data to a CD media in the order received. Reading is then facilitated using map data that enables reconstruction of the data into proper file order. It should be appreciated that the present invention can be implemented in numerous ways, including as a process, an apparatus, a system, computer readable media, or a device. Several inventive embodiments of the present invention are described below.

In one embodiment, a method for writing a file of data to a compact disc media is disclosed. The method begins by receiving a first portion of the file for writing to the compact disc media. Once received, the first portion is divided into a plurality of chunks. A map data sector is then generated for a set of the plurality of chunks, and the map data sector includes information for interrelating the file data and the plurality of chunks to be written to the compact disc media. The map data sector is then written to the compact disc media followed by the plurality of chunks of the first portion of the file. If possible, the plurality of chunks are first compressed before writing them to the compact disc media. In this embodiment, the compact disc media can either be a CD-RW media or a CD-R media.

If the first portion is long enough to fill multiple sets of chunks, associated map data sectors will be generated for those additional sets of chunks. In one embodiment, each map data sector can include multiple sets of map data. Reading of a file written to the compact disc media will include reading the map data for the file, decompressing the file if needed and then arranging the chunks of data in accordance with information provided by the map data. The file is then transferred to the requesting application in the arranged file order.

In another embodiment, a method for writing file data to a rewritable compact disc media is disclosed. The method includes: (a) receiving the file data in an out-of-order sequence for writing to the rewritable compact disc media; (b) receiving a first portion of the file data; (c) dividing the first portion of the file data into a plurality of chunks; (d) generating a plurality of map data sectors, such that one map data sector is associated with a set of the plurality of chunks, and the plurality of chunks include one or more sets of the plurality of chunks; (e) writing the plurality of map data sectors to the rewritable compact disc media beginning at a zero file offset; and (f) writing the plurality of chunks of the first portion of the file data to the rewritable compact disc media at a location that is logically after the plurality of map data sectors.

In still a further embodiment, computer readable media having program instructions for writing file data to a rewritable compact disc media is disclosed. The operations of the computer readable media include program instructions for: (a) receiving the file data in an out-of-order sequence for writing to the rewritable compact disc media; (b) receiving a first portion of the file data; (c) dividing the first portion of the file data into a plurality of chunks; (d) generating a plurality of map data sectors, such that one map data sector is associated with a set of the plurality of chunks, and the plurality of chunks include one or more sets of the plurality of chunks; (e) writing the plurality of map data sectors to the rewritable compact disc media beginning at a zero file offset; and (f) writing the plurality of chunks of the first portion of the file data to the rewritable compact disc media at a location that is logically after the plurality of map data sectors.

Advantageously, data written to a compact disc media can now be written in the order it is received, even if the order is not in the proper sequential file order. The generated map data is then used to enable reading of the file data from the compact disc media and arranging the file data into proper file order before transferring the file to a requesting application. As such, writing of data to a compact disc can be done more quickly and with less complicated pre-writing arranging algorithms which slow down systems and introduce significant programming complexity. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIGS. 6A and 6B illustrate another example of the portion that was received at a later time after receiving the portion described with reference to FIG. 5A, in accordance with one embodiment of the present invention.

DETAILED DESCRIPTION OF THE PREFERRED EMBODIMENTS

An invention is described for methods and computer readable media for writing file data to a CD media in the order received. Reading is then facilitated using map data that enables reconstruction of the data into proper file order. It will be obvious, however, to one skilled in the art, that the present invention may be practiced without some or all of these specific details. In other instances, well known process operations have not been described in detail in order not to unnecessarily obscure the present invention.

Figure 1:
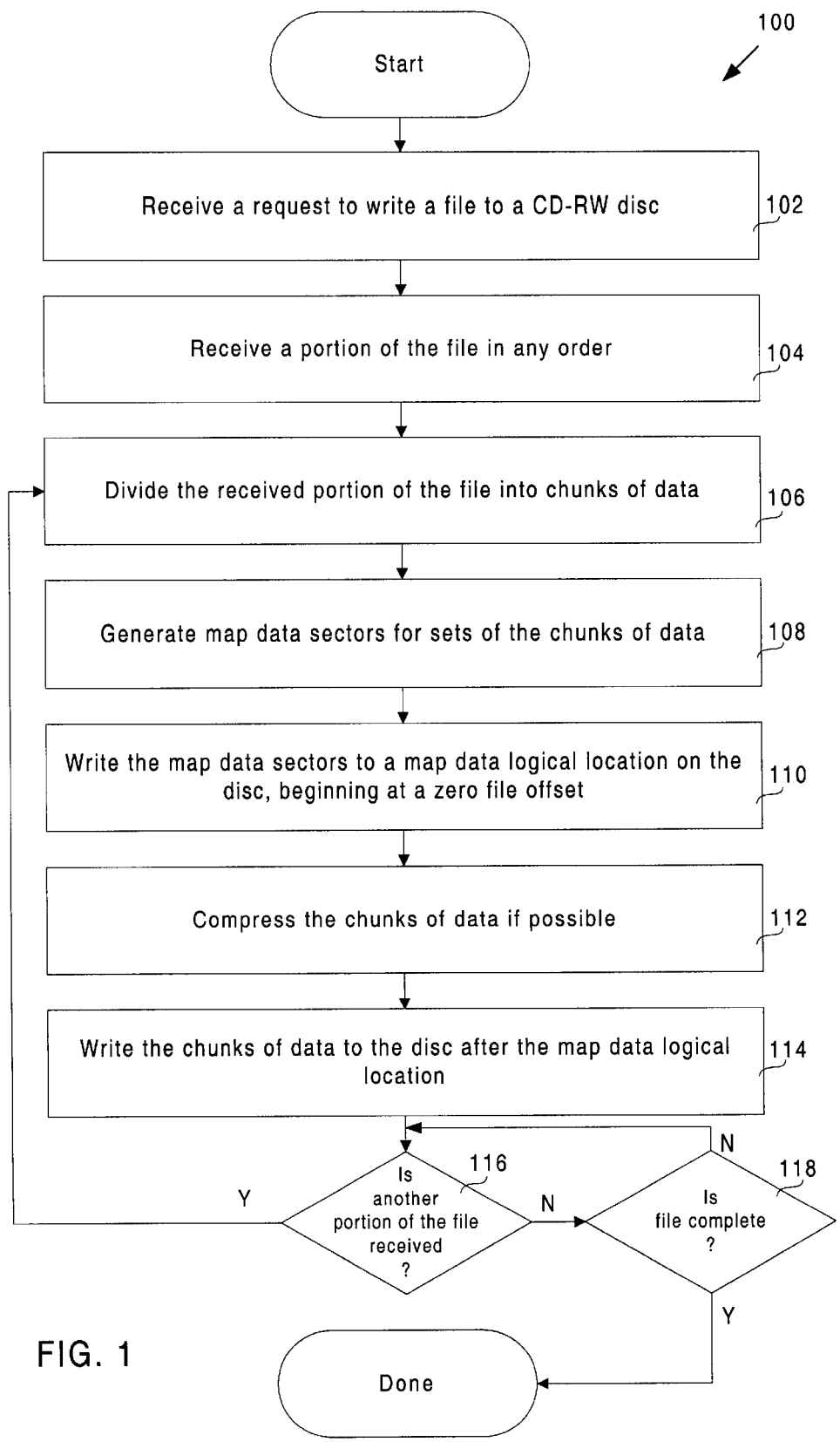
FIG. 1 is a high level flowchart diagram illustrating the method operations performed in writing data of a file to a CD-RW disc, in accordance with one embodiment of the present invention.

FIG. 1 is a high level flowchart diagram illustrating the method operations performed in writing data of a file to a CD-RW disc, in accordance with one embodiment of the present invention. It should be understood, however, that the media can also be a compact disc recordable (CD-R). The method begins at an operation 102 where a request is received to write a file to a CD-RW disc. Once the request is received in operation 102, the method will move to an operation 104 where a portion of the file in any order is received from the file system.

As described above, data is typically received from the file system in random order, or non-sequentially due to, for example, other data being transferred by the file system for other write requests. Now that a portion of data for the desired write request is received, the method will proceed to an operation 106 where the received portion of the file is divided into chunks of data. In this embodiment, the chunks of data are 64 kilobyte chunks. Of course, other size chunks can be implemented to divide the received portion of data. After the portion of data is divided, the method will proceed to an operation 108 where map data sectors are generated for sets of the chunks of data. As will be described below in greater detail, the map data is used to interrelate the received chunks of data of the requested file to the data that is written to the CD media to enable ordered file retrieval when reading from the CD media.

By way of example, the sets of chunks of data are preferably sets of 48 chunks, wherein each chunk is 64 K. If the remaining portion of the file does not completely fill 48 chunks, a set may be less than 48 chunks. Once the map sectors are generated for each of the sets of chunks of data in operation 108, the method will proceed to an operation 110 where the map data sectors are written to a map data logical location on the disc media.

The writing will begin at a zero file offset as defined by the Universal Disk Format (UDF) specification. The UDF specification, revisions 1.0, 1.01, 1.02, 1.5, and 2.0, all of which are managed by the Optical Storage Technology Association (OSTA), are hereby incorporated by reference. Once the map data sectors have been written to the map data logical location on the disc, the method will move to an operation 112 where the chunks of data are compressed if possible. As is well known, not all data types are able to be compressed, and therefore, a compression engine may or may not compress the particular chunks of data.

The method now moves to operation 114 where the chunks of data are written to the disc after the map data logical location. Now that the chunks of data have been written to the disc, the method will proceed to a decision operation 116. In decision operation 116, it is determined whether there is another portion of the file being received from the file system. If another portion is now being received, the method will proceed back to operation 106 where the received portion of the file is divided into data chunks. Then, map data sectors are generated for sets of the chunks of data in operation 108. Operations 110, 112, and 114 will then be performed for the received portion of the file.

When no more portions of the file are being received, the method will proceed to an operation 118 where it is determined if the file is complete. If the file is not complete, the method will return to operation 116 where a wait will occur until the next portion of the file is received. If the file is determined to be complete in operation 118, the method will be done.

Figure 2:
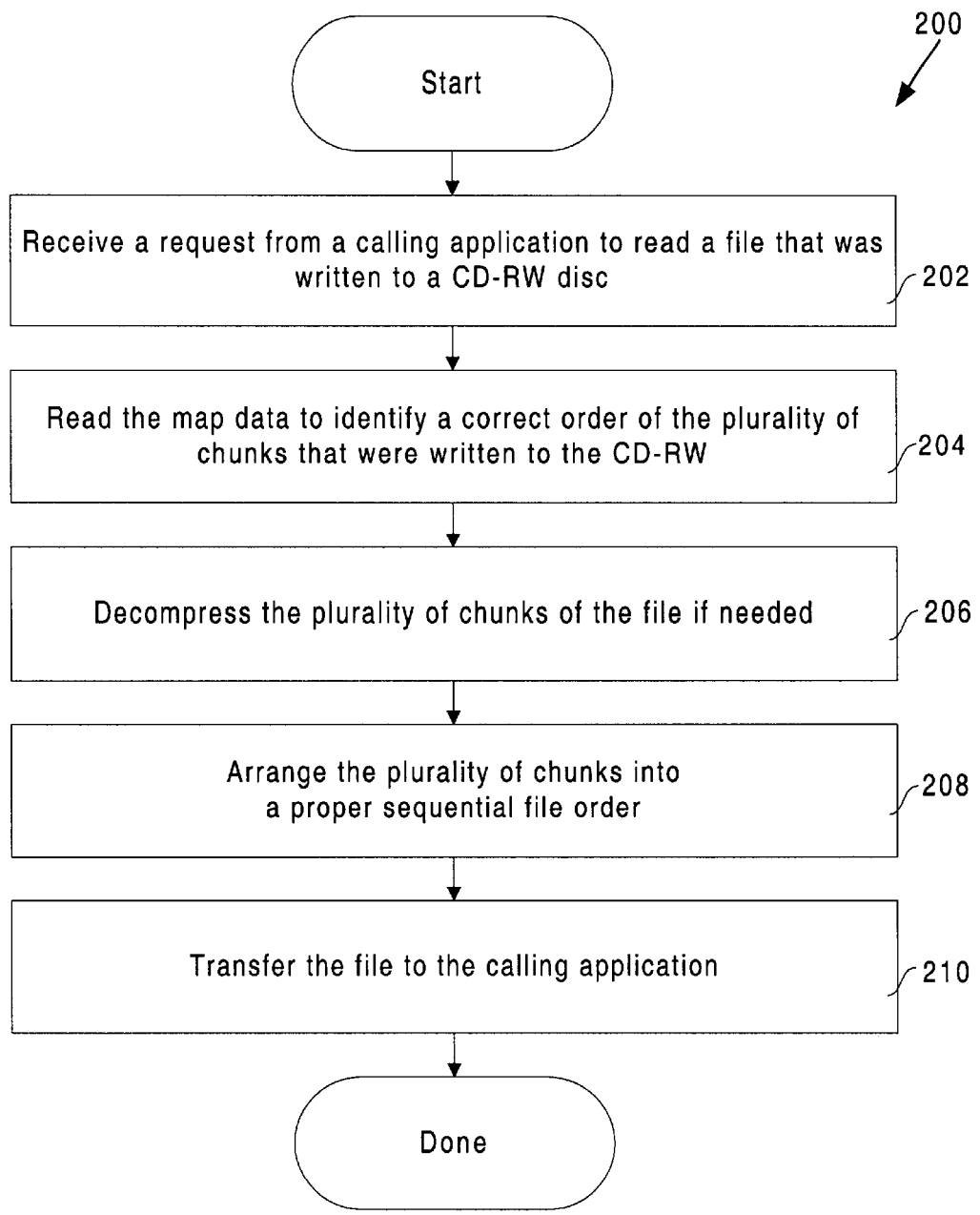
FIG. 2 illustrates a flowchart diagram detailing the method operations performed when reading data that has been written to the CD media using the technique described with reference to FIG. 1, in accordance with one embodiment of the present invention.

FIG. 2 illustrates a flowchart diagram 200 detailing the method operations performed when reading data that has been written to the CD media using the technique described with reference to FIG. 1, in accordance with one embodiment of the present invention. The method begins at an operation 202 where a request is received from a calling application to read a file that was written to the CD-RW disc. Once that request is received, the map data will be read to identify a correct order of the plurality of chunks that were written to the CD-RW in accordance with the writing of FIG. 1.

Once the correct order has been identified by referring to the map data, the method will proceed to operation 206 where the plurality of chunks of the file are decompressed if needed. As mentioned above, some data is not compressible and therefore, the decompression will not be needed. The method then advances to operation 208 where the plurality of chunks are arranged into a proper sequential order.

The proper sequential order will generally be different than the order in which the data was written to the disc. That is, when data is written to the disc in accordance with the technique described with reference to FIG. 1, data is received from the file system in any order, and at different times. However, when the file is desired to be read, the data must be returned to the calling application in the proper sequential order of the file. After the plurality of chunks have been arranged into the proper sequential file order in operation 208, the method will proceed to operation 210 where the file is transferred to the calling application. Upon completing the transfer of operation 210, the method will be done.

Figure 3:
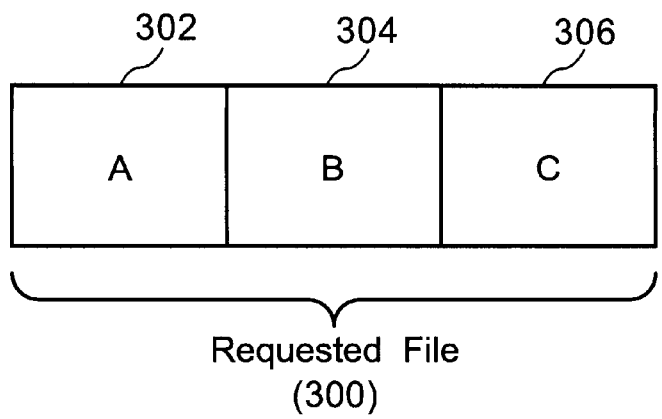
FIG. 3 illustrates a pictorial diagram of a requested file, in accordance with one embodiment of the present invention.
Figure 4:
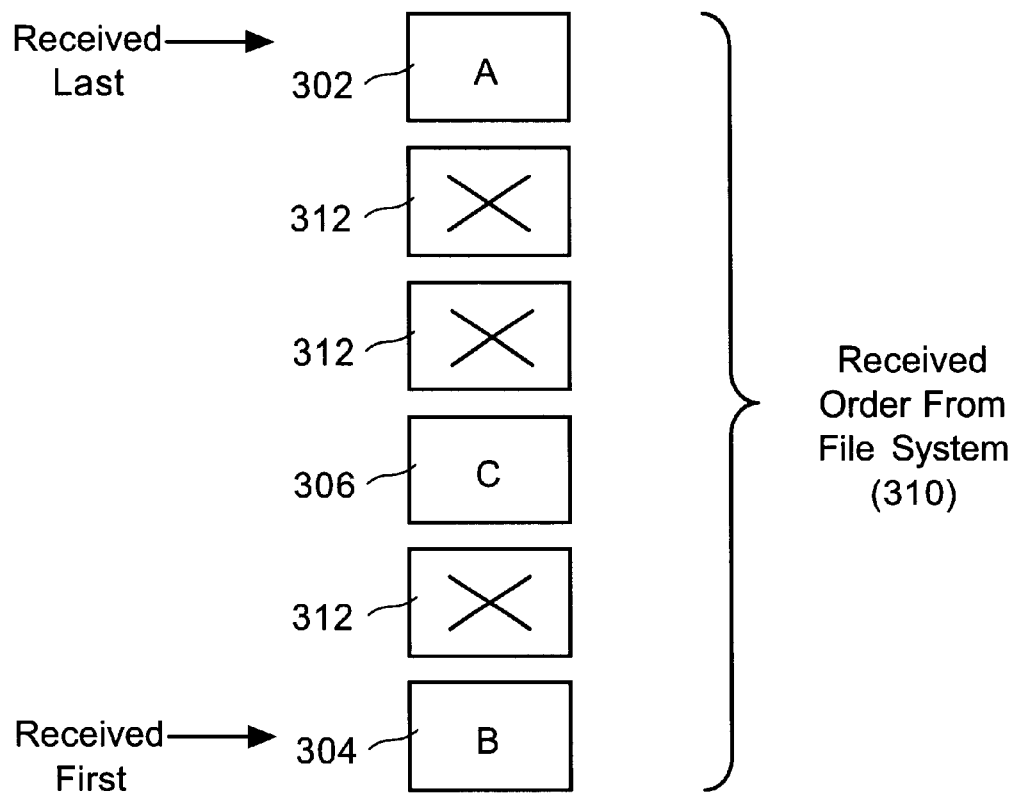
FIG. 4 illustrates portions of a file being received out-of-order.

FIG. 3 illustrates a pictorial diagram of a requested file 300 in accordance with one embodiment of the present invention. The requested file 300 is shown having different portions, which are identified as portion A 302, portion B 304, and portion C 306. Although the requested file 300 would optimally be written in order beginning with portion A, followed by portion B, and completing the file with portion C, the file system will typically not deliver the requested file 300 for writing in the proper order. By way of example, FIG. 4 illustrates an exemplary order of the requested file 300 from the file system 310.

As shown, portion B 304 is received first followed by a portion 312 which may correspond to another file that is requested to be written. Thus, the portion B 304 will be received first and after a period of time, the portion C 306 will be received. Next, the file system will deliver portions 312 which may also correspond to another file that is requested to be written. Finally, the last received portion A 302 will complete the requested file 300.

Figure 5A:
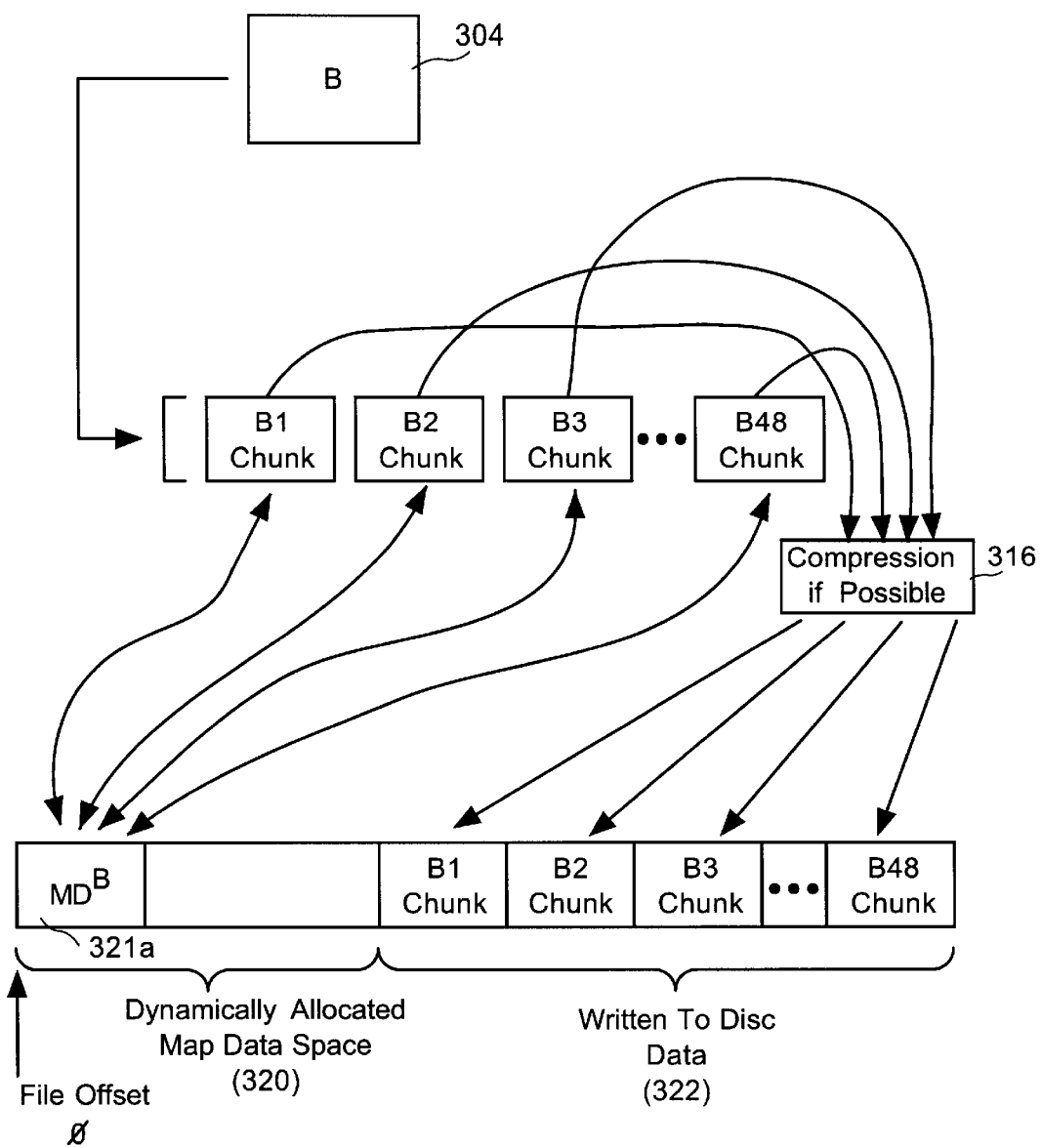
FIG. 5A illustrates a block diagram of the dividing of a portion of the requested file, and the writing to the disc media, in accordance with one embodiment of the present invention.

FIG. 5A illustrates a block diagram of the dividing of the portion B 304 of the requested file 300, and the writing to the disc media, in accordance with one embodiment of the present invention. As mentioned above, when the portion B 304 is received from the file system, the portion B is divided into a plurality of chunks. In one embodiment, the plurality of chunks are each 64K. Preferably, the portion B 304 is divided into sets of chunks, and each set will include 48 chunks. Each set of chunks will be associated with a map data (MD). As illustrated, the portion B 304 is divided into chunks B1, B2, B3 and on to B48. Each of the chunks, which are preferably 64K is then processed through a compression algorithm 316. The compression algorithm will then compress the chunks of data if possible.

As mentioned above, not all data is compressible and this determination will be made by the compression algorithm. The set of chunks will therefore be associated with the map data 321a and the data that was compressed, if possible, is written to the CD media. In this embodiment, the map data space 320 is dynamically allocated such that it is logically before the written data 322. However, in actuality, the data and the map data can be at any physical location on the CD media. However, the map data 321a for the first portion of data received will begin at a file offset zero.

Figure 5B:
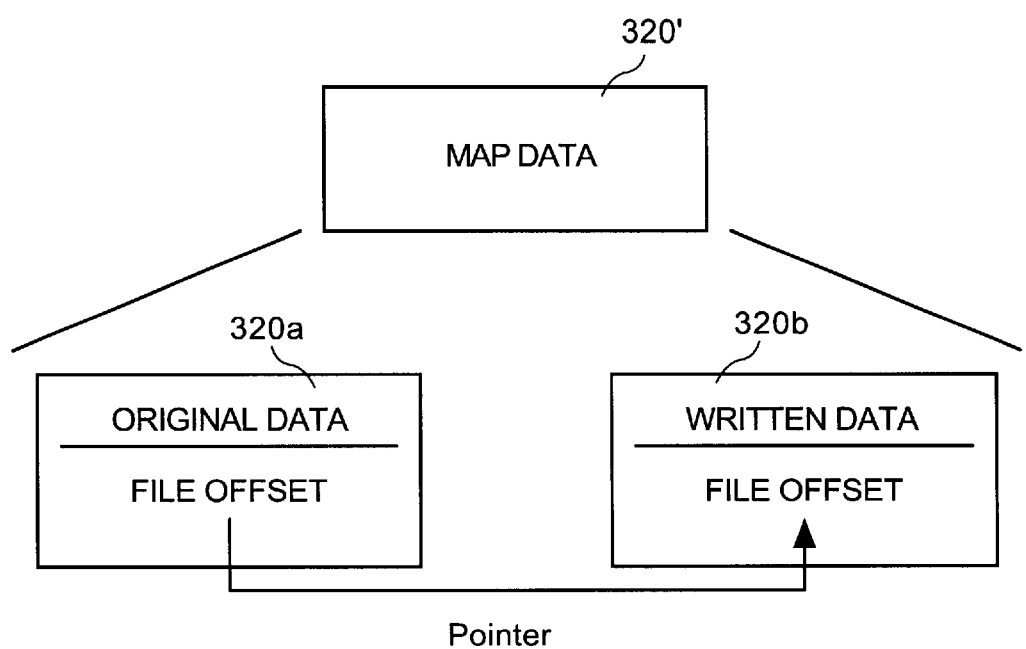
FIG. 5B illustrates in more detail the contents of map data, in accordance with one embodiment of the present invention.

FIG. 5B illustrates in more detail the contents of map data 320', in accordance with one embodiment of the present invention. As mentioned above, the map data will be associated with a set of chunks of the portion of data that was received from the file system. As pictorially illustrated in FIG. 5A, the map data (MD) 321a is associated with the set of chunks B1 through B48. The example of FIG. 5A assumes that the portion B 304 was divided and the dividing only generated 48 chunks of data. However, the portion B 304 could conceivably have fewer than 48 chunks, or multiple sets of 48 chunks. When there is more than one set of 48 chunks associated with a portion of data, then there will be additional map data 321 as will be illustrated below.

Returning to FIG. 5B, the map data 320' will include information regarding the original data 320a and regarding the written data 320b. Information regarding the original data 320a will include the file offset for the data that was received from the file system. A pointer will also be present between the original data and the written data. The pointer will thus allow an association with the file offset of the original data to the file offset of the written data. For example, when a request to read data that was written to the CD media is received, reference is made to the map data 320' which will first request the data that was associated with a particular file offset in the original data 320a. A pointer will thus refer to the file offset in the written data and reference will be made to a universal disc format (UDF) table which will locate the chunks of data that were written to the CD media and are now being requested.

FIG. 6A illustrates another example of the portion C 306 that was received at a later time after receiving the portion B described with reference to FIG. 5A. In this example, the portion C 306 was divided into multiple sets of chunks of data because the portion C 306 was larger than the portion B, in this example. Preferably, the portion C 306 is divided into sets of 48 chunks, each chunk being 64K in size. Accordingly, for each set of 48 chunks (and the last set which may be less than 48 chunks), a map data (MD) will be generated.

For illustration purposes, the first set will include chunks $C1_1$ through $C48_1$. The second set will include $C1_2$ through $C48_2$, the third set will include $C1_3$ through $C48_3$, and the fourth set will include $C1_4$ through $C40_4$. Once the portion C 306 has been divided as described with reference to FIG. 6A, the map data for the sets of chunks will be dynamically written to the media logically after the previously written map data 321a. Accordingly, map data 321b, 321c, 321d, and 321e are written in the map data space 320 of the CD media. As described above, the ordering of the map data is ordered such that the map data is dynamically ordered as illustrated in FIG. 6B.

Following the map data, will be the chunks of data which are written after the previously received portion B that was illustrated in FIG. 5A. It should be appreciated that the writing of the data to the CD media is in an out-of-order manner, and thus facilitates and simplifies the writing of the data to the CD media.

Figure 7A:
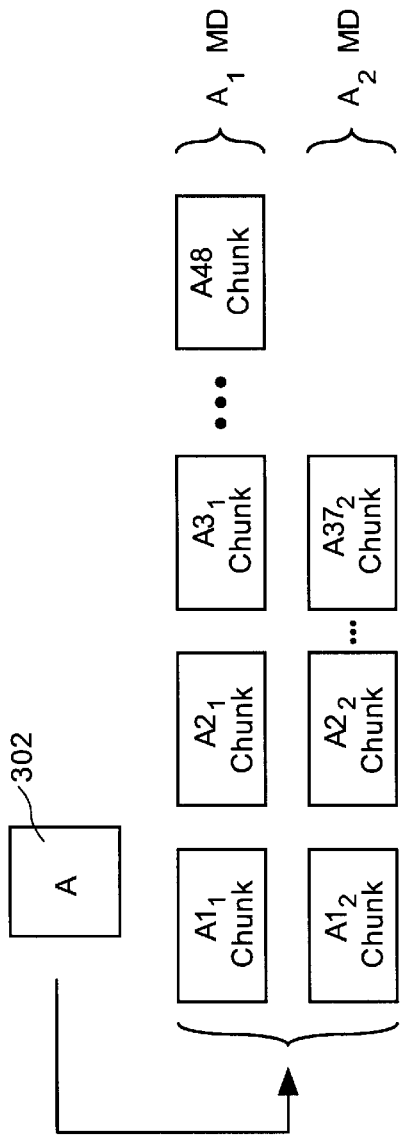
FIGS. 7A and 7B illustrate the process of dividing the last portion that was received from the file system as shown in FIG. 4 above, in accordance with one embodiment of the present invention.

FIG. 7A illustrates the process of dividing the last portion A 302 that was received from the file system as shown in FIG. 4 above. In this example, the portion A 302 will be divided into two sets of chunks. The first set of chunks $A1_1$, through $A48_1$ will be associated with a map data $A_1$, and chunks $A1_2$ through $A37_2$ will be associated with map data $A_2$. Once the portion A has been divided into chunks of data, the map data will be written dynamically and logically after the previously written map data to the CD media.

Figure 7B:
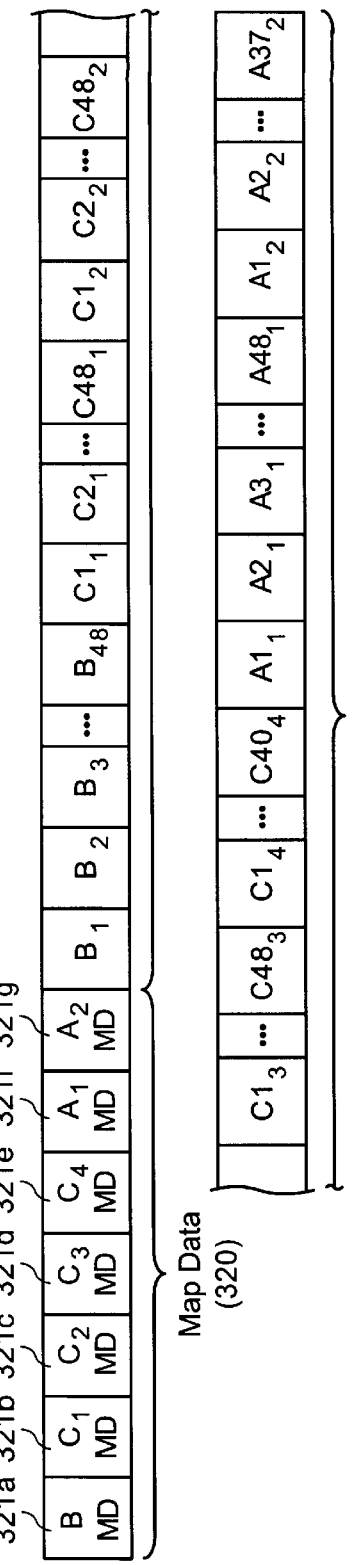

In this example, the map data 321f and 321g are written after the previously written map data. The chunks of data for the portion A 302 are then compressed, if possible, and then written to the CD media in the written data region 322. The written data is also logically arranged in the received order after the previously written data, as shown in FIG. 7B.

Figure 8:
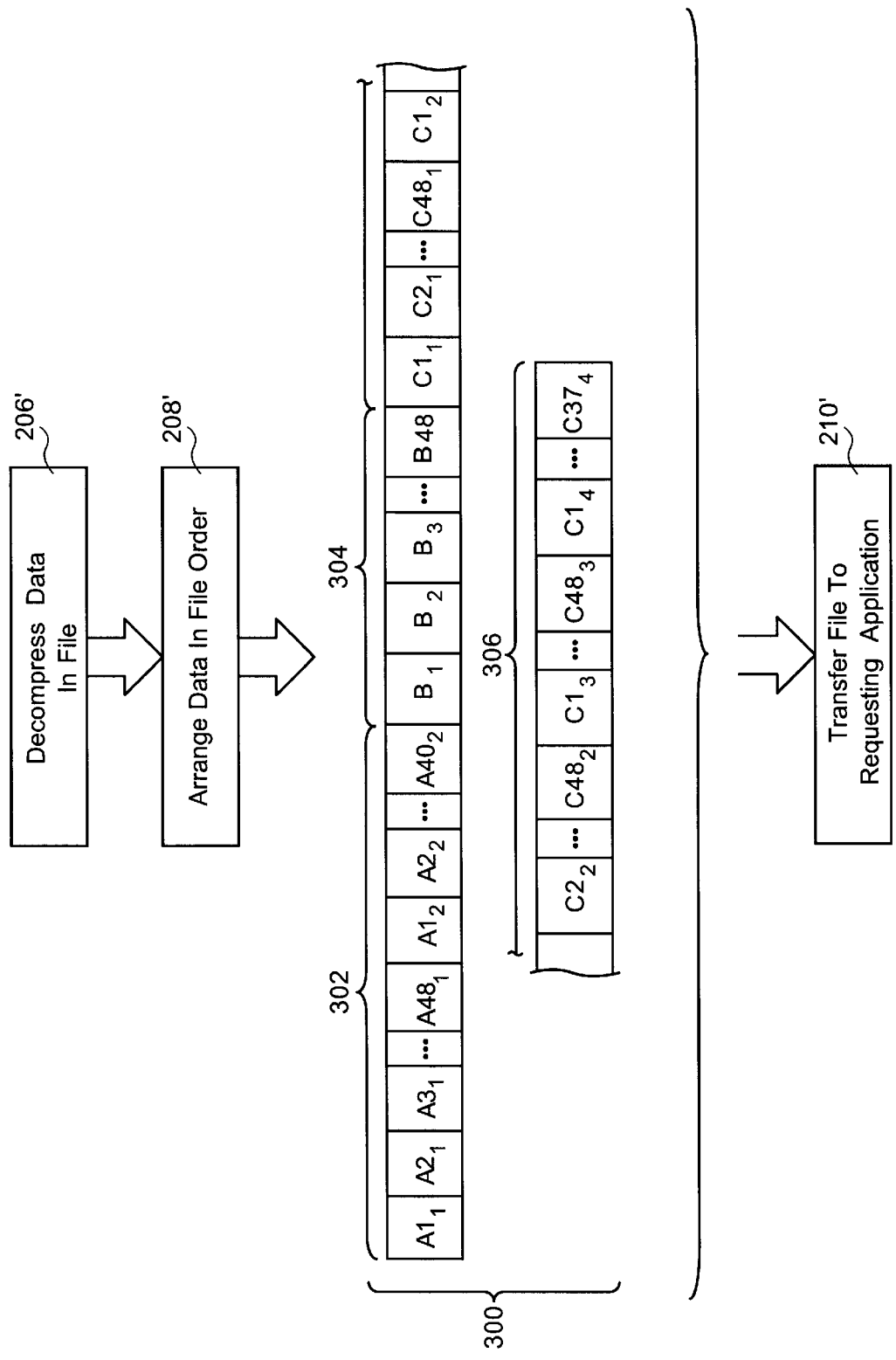
FIG. 8 illustrates a pictorial diagram of the reading of data that was previously written to the CD media, in accordance with one embodiment of the present invention.

FIG. 8 illustrates a pictorial diagram of the reading of data that was previously written to the CD media, in accordance with one embodiment of the present invention. The process begins by decompressing the data in the file that was requested. Once the data in the file is decompressed if needed, in 206', the process moves to 208' where the data is arranged in file order. The arranging of the data in file order will then take place to produce the requested file 300. As shown, the requested file 300 will have portion A 302, portion B 304, and portion C 306 properly arranged. Once the requested file 300 has been arranged in the file order, the process will move to transfer the file to the requesting application in operation 210'.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for writing a file of data to a compact disc media, comprising:

receiving a first portion of the file for writing to the compact disc media;

dividing the first portion of the file into a plurality of chunks;

generating a map data sector for a set of the plurality of chunks, the map data sector including information for interrelating the file data and the plurality of chunks to be written to the compact disc media;

writing the map data sector to the compact disc media; and writing the plurality of chunks of the first portion of the file to the compact disc media, wherein additional plurality of chunks for any additional portions of the file are written consecutively and any additional map data sectors for the additional plurality of chunks are grouped to be written before all of the plurality of chunks, and wherein each map data sector is directly associated with its plurality of chunks.

2. A method for writing a file of data to a compact disc media as recited in claim 1, wherein before writing the plurality of chunks of the first portion, the method further comprises:

compressing the plurality of chunks.

3. A method for writing a file of data to a compact disc media as recited in claim 1, wherein each of the plurality of chunks is about 64 kilobytes.

4. A method for writing a file of data to a compact disc media as recited in claim 3, wherein the set of the plurality of chunks is no greater than 48 chunk long.

5. A method for writing a file of data to a compact disc media as recited in claim 1, further comprising:

reading the written file of data, the reading includes,
reading the map data sector to identify a correct file order of the plurality of chunks;
arranging the plurality of chunks into the correct file order;
transferring the arranged plurality of chunks to a requesting application.

6. A method for writing a file of data to a compact disc media as recited in claim 1, wherein the compact disc is one of a compact disc rewritable disc (CD-RW) and a compact disc recordable (CD-R).

7. A method for writing a file of data to a compact disc media as recited in claim 1, wherein the map data sector includes an original data file offset and a written data file offset, and a pointer is provided between the original data file offset to the written data file offset.

8. A method for writing a file of data to a compact disc media, comprising:

receiving a first portion of the file for writing to the compact disc media;

dividing the first portion of the file into a plurality of chunks;

generating a map data sector for a set of the plurality of chunks, the map data sector including information for interrelating the file data and the plurality of chunks to be written to the compact disc media;

writing the map data sector to the compact disc media; and writing the plurality of chunks of the first portion of the file to the compact disc media, the method further including, receiving a second portion of the file for writing to the compact disc media;

dividing the second portion of the file into a plurality of chunks;

generating a map data sector for a set of the plurality of chunks;

writing the map data sector to the compact disc media, the map data sector for the set of the plurality of chunks associated with the second portion is logically written after the map data sector for the set of the plurality of chunks associated with the first portion; and writing the plurality of chunks of the second portion of the file to the compact disc media logically after the plurality of chunks of the first portion of the file.

9. A method for writing file data to a rewritable compact disc media, comprising:

receiving the file data in an out-of-order sequence for writing to the rewritable compact disc media;

receiving a first portion of the file data;

dividing the first portion of the file data into a plurality of chunks;

generating a plurality of map data sectors, such that one map data sector is associated with a set of the plurality of chunks, the plurality of chunks including one or more sets of the plurality of chunks;

writing the plurality of map data sectors to the rewritable compact disc media beginning at a zero file offset; and writing the plurality of chunks of the first portion of the file data to the rewritable compact disc media, wherein additional plurality of chunks for any additional portions of the file are written consecutively and any additional map data sectors for the additional plurality of chunks are grouped to be written before all of the plurality of chunks, and wherein each map data sector is directly associated with its plurality of chunks.

10. A method for writing file data to a rewritable compact disc media as recited in claim 9, further comprising:

compressing the plurality of chunks of the first portion of the file data before writing to the rewritable compact disc media.

11. A method for writing file data to a rewritable compact disc media as recited in claim 9, wherein each of the plurality of chunks is 64K bytes long and the set of plurality of chunks is no longer than 48 chunks long.

12. A method for writing file data to a rewritable compact disc media as recited in claim 9, wherein each map data sector includes an original data file offset and a written data file offset for the associated set of the plurality of chunks, and a pointer is provided from the original data file offset to the written data file offset.

13. A method for writing file data to a rewritable compact disc media as recited in claim 9, further comprising:

reading the file data that was written to the rewritable compact disc media, the reading includes,
reading the plurality of map data sectors to identify a correct file order of the plurality of chunks;
arranging the plurality of chunks into the correct file order;
transferring the arranged plurality of chunks to a requesting application.

14. A method for writing file data to a rewritable compact disc media, comprising:

receiving the file data in an out-of-order sequence for writing to the rewritable compact disc media;

receiving a first portion of the file data;

dividing the first portion of the file data into a plurality of chunks;

generating a plurality of map data sectors, such that one map data sector is associated with a set of the plurality of chunks, the plurality of chunks including one or more sets of the plurality of chunks;

writing the plurality of map data sectors to the rewritable compact disc media beginning at a zero file offset; and writing the plurality of chunks of the first portion of the file data to the rewritable compact disc media at a location that is logically after the plurality of map data sectors, the method further including,
receiving a second portion of the file data;
dividing the second portion of the file data into a plurality of chunks;
generating a plurality of map data sectors;
writing the plurality of map data sectors associated with the second portion to the rewritable compact disc media at a logical location that is after the map data sectors of the first portion; and
writing the plurality of chunks of the second portion of the file data to the rewritable compact disc media at another location that is logically after the plurality of chunks of the first portion.

15. A method for writing file data to a rewritable compact disc media as recited in claim 14, further comprising:

compressing the plurality of chunks of the second portion of the file data before writing to the rewritable compact disc media.

16. A computer readable media having program instructions for writing file data to a rewritable compact disc media, the operations of the computer readable media comprise:

program instructions for receiving the file data in an out-of-order sequence for writing to the rewritable compact disc media;

program instructions for receiving a first portion of the file data;

program instructions for dividing the first portion of the file data into a plurality of chunks;

program instructions for generating a plurality of map data sectors, such that one map data sector is associated with a set of the plurality of chunks, the plurality of chunks including one or more sets of the plurality of chunks;

program instructions for writing the plurality of map data sectors to the rewritable compact disc media beginning at a zero file offset; and program instructions for writing the plurality of chunks of the first portion of the file data to the rewritable compact disc media, wherein additional plurality of chunks for any additional portions of the file are written consecutively and any additional map data sectors for the additional plurality of chunks are grouped to be written before all of the plurality of chunks, and wherein each map data sector is directly associated with its plurality of chunks.

17. A computer readable media as recited in claim 16, further comprising:

program instructions for compressing the plurality of chunks of the first portion of the file data before writing to the rewritable compact disc media.

18. A computer readable media as recited in claim 16, wherein each of the plurality of chunks is 64K bytes long and the set of plurality of chunks is no longer than 48 chunks long.

19. A computer readable media as recited in claim 16, wherein each map data sector includes an original data file offset and a written data file offset for the associated set of the plurality of chunks, and a pointer is provided from the original data file offset to the written data file offset.

20. A computer readable media as recited in claim 16, further comprising:

program instructions for reading the file data that was written to the rewritable compact disc media, the reading includes,
program instructions for reading the plurality of map data sectors to identify a correct file order of the plurality of chunks;
program instructions for arranging the plurality of chunks into the correct file order;
program instructions for transferring the arranged plurality of chunks to a requesting application.

21. A method for writing file data to an optical storage media, comprising:
receiving the file data in an out-of-order sequence for writing to the optical storage media;
receiving a first portion of the file data;
dividing the first portion of the file data into a plurality of chunks;
generating a plurality of map data sectors, such that one map data sector is associated with a set of the plurality of chunks, the plurality of chunks including one or more sets of the plurality of chunks;
writing the plurality of map data sectors to the optical storage media beginning at a zero file offset; and
writing the plurality of chunks of the first portion of the file data to the optical storage media, wherein additional plurality of chunks for any additional portions of the file are written consecutively and any additional map data sectors for the additional plurality of chunks are grouped to be written before all of the plurality of chunks, and wherein each map data sector is directly associated with its plurality of chunks.

22. A method for writing file data to an optical storage media as recited in claim 21, wherein the optical storage media is one of a compact disc rewritable and a compact disc recordable.

23. A method for writing file data to an optical storage media as recited in claim 21, further comprising:
compressing the plurality of chunks of the first portion of the file data before writing to the rewritable compact disc media.

24. A method for writing file data to an optical storage media as recited in claim 21, wherein each of the plurality of chunks is 64K bytes long and the set of plurality of chunks is no longer than 48 chunks long.

25. A method for writing file data to an optical storage media as recited in claim 21, wherein each map data sector includes an original data file offset and a written data file offset for the associated set of the plurality of chunks, and a pointer is provided from the original data file offset to the written data file offset.

* * * * *